United States Patent [19]

Elger

[11] Patent Number: 4,700,621
[45] Date of Patent: Oct. 20, 1987

[54] JUICE EXTRACTOR QUICK CONNECT/DISCONNECT COUPLING

[75] Inventor: John H. Elger, Milwaukee, Wis.

[73] Assignee: Sunbeam Corporation, Downers Grove, Ill.

[21] Appl. No.: 917,932

[22] Filed: Oct. 14, 1986

[51] Int. Cl.[4] ............................ A23N 1/02; F16D 1/00
[52] U.S. Cl. ........................................ 99/511; 99/513; 403/24; 403/348
[58] Field of Search .................. 99/509–513, 99/495; 403/24, 25, 343, 348, 349; 210/455

[56] References Cited

U.S. PATENT DOCUMENTS

| | | |
|---|---|---|
| 1,541,489 | 6/1925 | Ely . |
| 2,017,591 | 10/1935 | Dumm ................................. 64/100 |
| 2,401,992 | 6/1946 | Waller ................................. 192/56 |
| 2,885,918 | 5/1959 | Allimann ............................. 81/52.4 |
| 4,183,293 | 1/1980 | Arao et al. ............................. 99/512 |
| 4,338,961 | 7/1982 | Karpenko ......................... 137/243.2 |
| 4,345,517 | 8/1982 | Arao et al. ........................... 99/511 |
| 4,417,650 | 11/1983 | Geisthoff ............................ 192/56 R |
| 4,468,206 | 8/1984 | Herchenbach et al. ............. 464/37 |
| 4,507,006 | 3/1985 | Golob et al. ......................... 403/24 |

FOREIGN PATENT DOCUMENTS 207519  2/1960  Fed. Rep. of Germany ........ 99/511

Primary Examiner—Timothy F. Simone
Attorney, Agent, or Firm—Neil M. Rose

[57] ABSTRACT

A quick connect/disconnect coupling for a high-speed appliance such as a juice extractor wherein the driven member, such as a juicer filter basket, is both positively connected for rotation and axially latched to a drive assembly very simply and without any mechanical adjustment.

10 Claims, 9 Drawing Figures

JUICE EXTRACTOR QUICK CONNECT/DISCONNECT COUPLING

BACKGROUND OF THE INVENTION

In the juice extractor art, it is important to provide an effective but simple method for connecting and disconnecting the inverted conical filter screen used in so many juice extractors to and from the drive shaft of the high-speed motor required in such appliances. Therefore, as soon as one juice extraction operation has been completed, the filter screen may be quickly disconnected, cleaned, and reconnected for a different juice extraction operation. Many known juice extractors utilize couplings with separate elements providing the latching and driving functions with time-consuming manual mechanical adjustment required for one or the other, if not both.

SUMMARY OF THE INVENTION

A quick connect/disconnect coupling for an appliance such as a juice extractor is disclosed herein. This quick connect/disconnect coupling provides both a latching function and a positive driving function for a juice extractor filter basket whereby to provide a positive, safe transfer of torque at high speeds, i.e., 10,000 rpm, without requiring any manual mechanical adjustment of the coupling. The filter basket is merely fitted over a drive assembly portion of the coupling, which is secured to the drive shaft of the high-speed motor, and the latching and driving connection is quickly and automatically made.

A principal object of the present invention is to provide a new and improved quick connect/disconnect coupling.

Another object of the present invention is to provide such a coupling for an appliance such as a juice extractor of the type which utilizes an inverted filter basket which rotates at very high speeds in the order of 10,000 rpm, and thus requires a positive latching feature as well as a positive torque-transmitting driving feature.

A still further object of the present invention is to provide such a quick connect/disconnect coupling wherein the drive member or filter basket is provided with a circular recess adapted to receive a circular drive assembly which is secured to the high-speed motor drive shaft and wherein the driven member recess is provided with a series of vertical slots and wherein the drive assembly is provided with a series of radially slidable drive slugs which are biased outwardly by light-weight springs into engagement with said driven member slots, the slugs being retained in latching engagement in said slots during high-speed rotation of the drive assembly by centrifugal force and the drive slugs having side surfaces in positive driving engagement with vertical sides of the driven member slots, the upper and lower corners of the outer ends of the drive slugs are beveled to provide camming surfaces for camming the slugs inwardly of the drive assembly to facilitate both quick connection of the driven member to the drive assembly and quick disconnection of the driven member from the drive assembly.

A still further object of the present invention is to provide such a quick connect/disconnect coupling wherein separate alignment means are provided for the driven member and the drive assembly whereby the latching and driving coupling elements need not provide the centering function, proper alignment being necessary to minimize vibration at high speeds.

Another object of the present invention is to provide such a quick connect/disconnect coupling wherein light-weight spring means are provided for biasing the drive slugs outwardly until centrifugal force takes over, the light-weight springs obviously facilitating inward camming movement of the drive slugs during both connection and disconnection of the driven member to and from the drive assembly whereas heavy-duty springs would hinder such camming movement.

A still further object of the present invention is to provide such a quick connect/disconnect coupling wherein three equidistantly spaced drive slugs are provided on the drive assembly but a much larger number of slots are provided on the driven member, thus facilitating the connection of the driven member to the drive assembly.

Other objects of the present invention will become obvious to one skilled in the art upon a perusal of the specification and claims in light of the accompanying drawings.

DESCRIPTION OF THE PREFERRED EMBODIMENT

Figure 1:
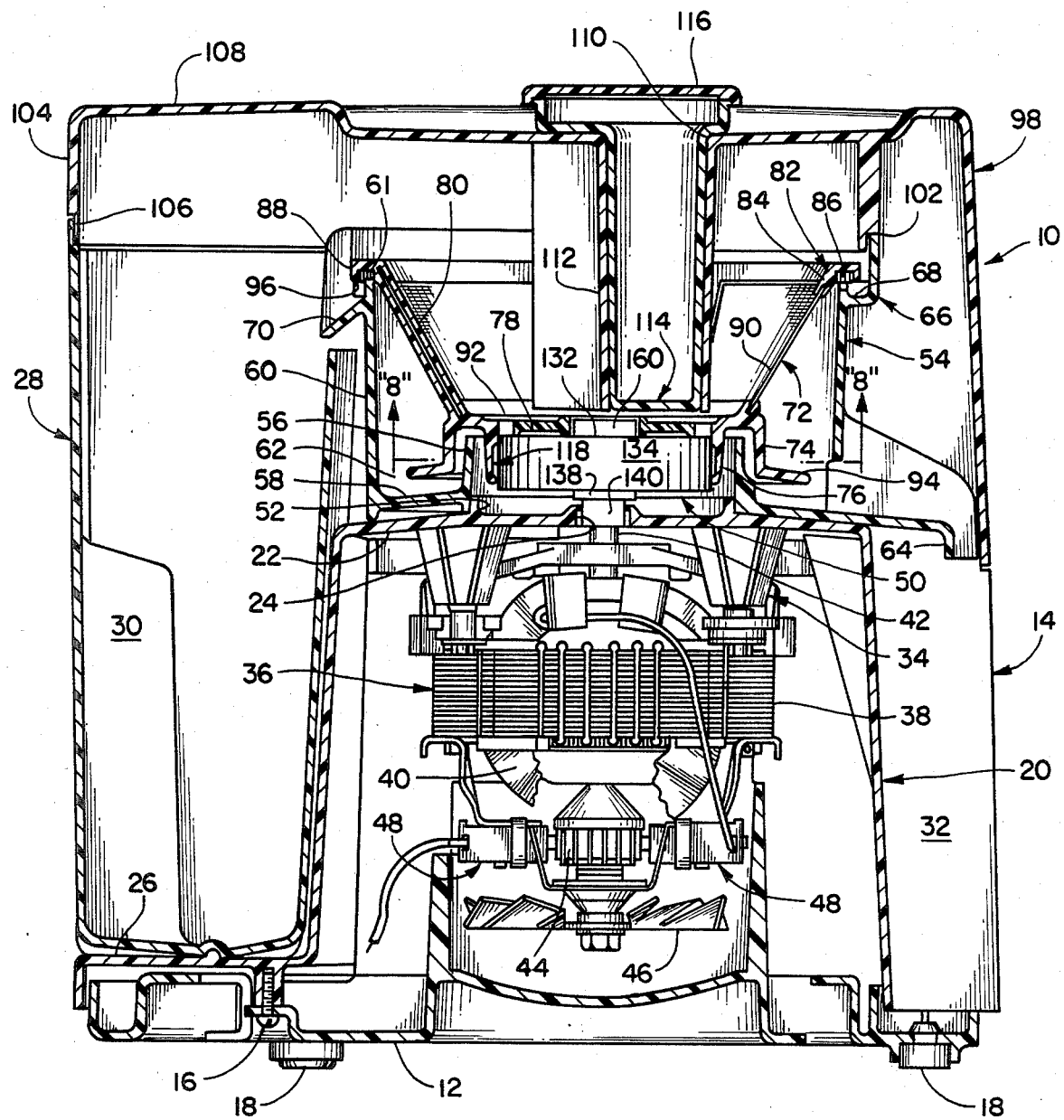
FIG. 1 is a vertical sectional view taken through a juice extractor having a quick connect/disconnect coupling embodying the invention.
Figure 2:
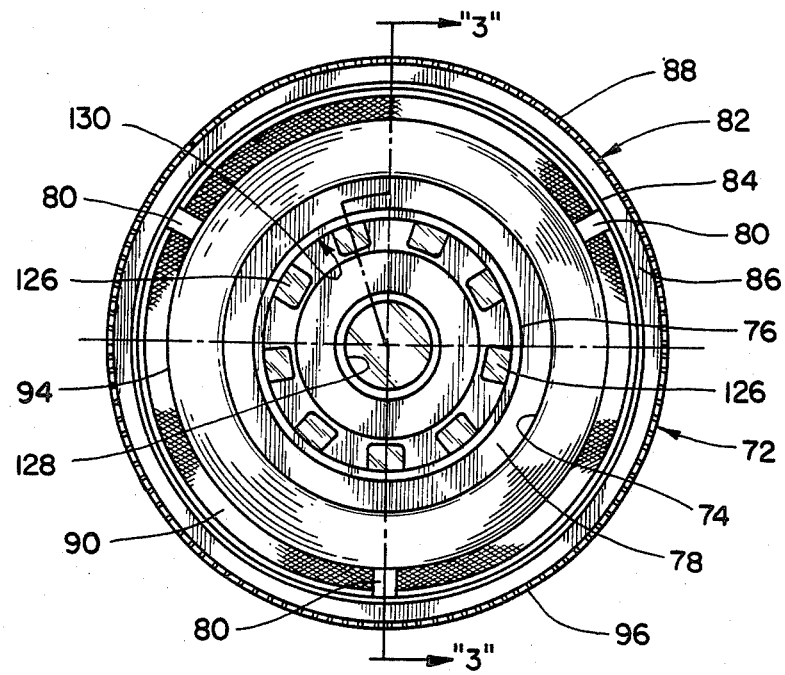
FIG. 2 is a bottom plan view of the filter basket shown in FIG. 1.

Referring now to the drawings, a juice extractor 10 is shown in vertical section in FIG. 1. The juice extractor 10 is characterized by a bottom plate 12 to which is secured a lower housing member 14 by suitable fastening means, as at 16. Suitable supporting feet 18 are provided on the bottom plate 12. The lower housing member 14 is characterized by a tower portion 20 having an upper wall 22 with a circular opening 24 generally centered therein, by a shelf portion 26 at one side adapted to support a removable open-topped pulp collector 28 having hand-grip recess means 30, and by a vertically extending concave recess 32 formed in the side wall of the tower portion 20 opposite the shelf portion 26 for a purpose to be discussed hereinafter.

Disposed within the tower portion 20 and suspended from the upper wall 22 thereof by suitable supporting means 34 is a unitary high speed motor assembly 36 including a stator 38, an armature 40, and a drive shaft 42 which extends upwardly through the opening 24 formed in the upper wall 22 and which has a commutator 44 and a motor-cooling fan 46 mounted on its lower portion, suitable brush assemblies 48 being provided for the commutator 44. Although not illustrated in FIG. 1, a power cord and suitable wiring is provided for the motor assembly 36. Secured to the upper end of the drive shaft 42 is a drive assembly 50 for a quick connect-/disconnect coupling embodying the invention which will be described in detail hereinafter.

An annular raised wall formation 52 is provided on the top surface of the upper wall 22 of the tower portion 20 coaxial with the opening 24 formed therein. A plastic-molded juice collector 54 is characterized by a sleeve formation 56 adapted to be somewhat loosely fitted over said annular wall formation 52, and by a bottom wall 58 extending between said sleeve formation 56 and an outer annular wall 60 whereby to define an annular juice collecting trough 62 having a discharge spout 64 associated therewith. The juice collector 54, which is readily mountable on and removable from the tower portion 20 of the lower housing member 14, is rotatably positioned thereon by guide means (not shown) provided on the upper wall 22 of the tower portion 20 so that the discharge spout 64 is aligned with the concave recess 32 whereby a glass or pitcher may be positioned thereunder to collect the extracted juice.

The juice collector 54 is further characterized at its upper end by an angular wall formation 66 which extends outwardly slightly below an upper edge 61 of the outer annular wall 60 and then upwardly past the upper edge 61 of the wall 60 to define a narrow trough 68 for the collection of pulp. The trough 68 is also characterized by a downwardly inclined exit formation 70 which is disposed diametrically opposite from the juice discharge spout 64 whereby to discharge the pulp into the pulp collector 28 supported on the shelf portion 26.

Figure 3:
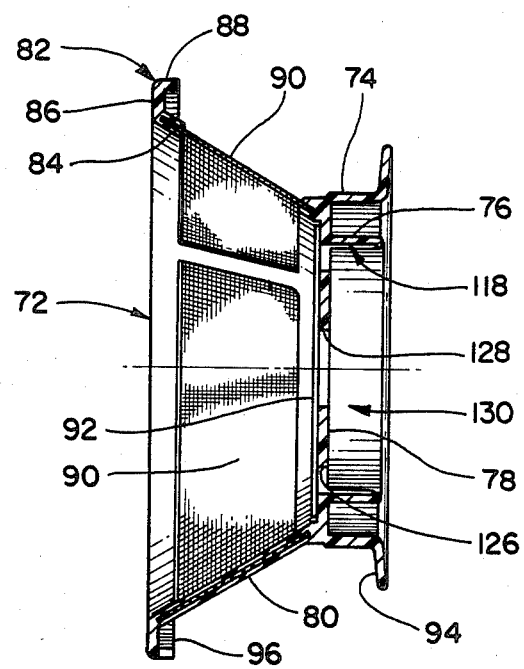
FIG. 3 is a vertical sectional view through the filter basket taken generally on line 3—3 of FIG. 2.

With the juice collector 54 supported on the tower portion 20, an inverted conical filter basket 72 is next assembled to the juice extractor 10. The filter basket 72, which comprises the driven member of the quick connect/disconnect coupling of the present invention, is generally disposed within the plastic-molded juice collector 54 and both axially latched and drivingly connected to the drive assembly 50 by the quick connect-/disconnect coupling to be fully described hereinafter. The filter basket 72 is characterized by a lower annular wall 74 adapted to fit over the sleeve formation 56 of the juice collector 54, by a second depending coaxial inner wall formation 76 adapted to be received within the sleeve formation 56, by an integral top wall 78 which extends thereover, and by a series of upwardly and outwardly inclined integral struts 80 which terminate in an integral, generally inverted U-shaped (in cross-section) annular formation 82 having an outwardly and upwardly inclined portion 84, a horizontal portion 86 extending outwardly therefrom and adapted to extend over the upper edge 61 of the outer annular wall 60 of the juice collector 54, and a depending portion 88 rotatable in the pulp trough 68. Filter screening 90 of a known material and mesh is secured in a known manner in the spaces defined between the struts 80 and the upper inclined formation 82 and the outer lower wall 74. A cutter plate 92 (FIG. 3) having a number of raised cutting teeth (not shown) is secured in the bottom of the filter basket 72 on the top wall 78.

As the fruit or vegetables from which juice is to be extracted is forced downwardly, as will be described, against the rapidly rotating cutter plate 92, the small pieces are thrown outwardly by centrifugal force against the filter screening 90 with the juice being centrifugally extracted into the juice trough 62. An outwardly directed flange 94 integrally formed on the bottom edge of the outer lower wall 74 of the filter basket 72 serves to prevent any of the extracted juice from passing inwardly of the sleeve formation 56 and through the shaft opening 24 and onto the motor assembly 36. The depending formation 88 at the upper portion of the filter basket 72 is provided with a toothed configuration 96 which serves to minimize passage into the juice trough 62 of the pulp, which creeps up the inner surface of the filter basket 72 and over the edge into the pulp trough 68, but rather directs the pulp toward the pulp exit area 70 for collection in the pulp collector 28.

The juice extractor 10 is further characterized by an upper housing member 98 which is removably supported on the upper edges of the angular wall portion 66 of the juice collector 54, as at 102 in FIG. 1. A portion 104 of the upper housing member 98, which, in turn, is supported on the tower portion 20 of the lower housing member 14, also extends over the shelf 26 of the lower housing member 14 and is engageable by the upper edge of the pulp collector 28, when supported on the shelf 26, as at 106 in FIG. 1. Although not shown in the drawings, the upper housing member 98 preferably is clamped to the lower housing member 14 by quick-acting clamping devices well known in the art. A top wall 108 of the upper housing member 98 has an opening 110 formed therein with a sleeve formation 112 depending therefrom and adapted to receive a food pusher 114 therein. The opening 110 and sleeve formation 112 are positioned eccentrically over the cutter plate 92 whereby fruits and vegetables from which juice is to be extracted may be forced by the food pusher 114 against the rapidly rotating food cutter 92 at a location offset from the center thereof. The food pusher 114 has a hand grip portion 116 at the upper end thereof.

Figure 7:
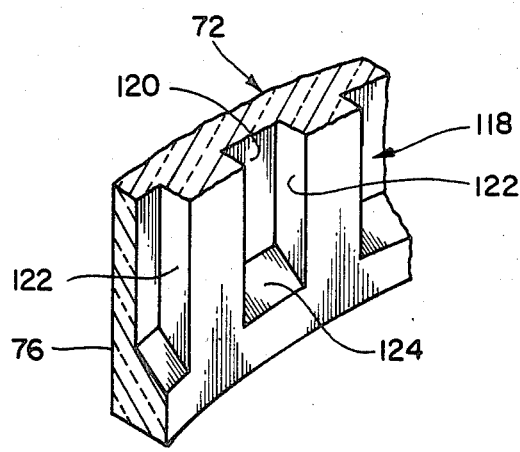
FIG. 7 is an enlarged, fragmentary perspective view of the latching and driving slots provided on the lower portion of the filter basket.
Figure 8:
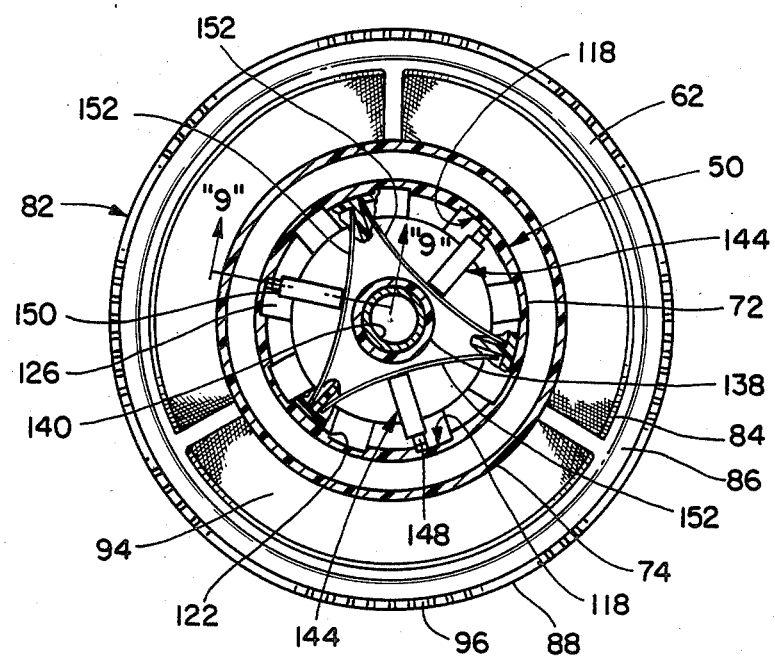
FIG. 8 is a horizontal sectional view taken generally on line 8—8 of FIG. 1 and showing the filter basket latchingly and drivingly coupled to the drive assembly.

With particular reference to FIGS. 3, 7, 8 and 9, the filter basket 72 or driven member of the quick connect-/disconnect coupling of the present invention has a series of vertically extending slots or detents 118 spaced circumferentially around the inner surface of the depending annular wall formation 76. As best illustrated in FIG. 7, each slot 118 has an inner end wall 120, a pair of vertically extending side walls 122, and a bottom wall 124 which is inclined inwardly and downwardly to define a camming surface. The upper ends of the slots 118 terminate in radial openings 126 provided in the wall 78 underlying the cutter plate 92. A circular opening 128 is also provided in the center of the wall 78 coaxial with the depending annular wall formation 76 for a reason to be described hereinafter, which wall formation 76 defines a downwardly opening recess 130 in the driven member of the quick connect/disconnect coupling which is adapted to receive the drive assembly 50, the driven member of the coupling of the present invention.

With particular reference to FIGS. 4, 5, 6, 8 and 9, the drive assembly 50, which is circular and of a size to be received in the circular recess 130 of the filter basket 72 or driven member, is characterized by a top wall 132, by an annular wall 134 depending from the peripheral edge of the top wall 132 and having a series of circumferentially and equidistantly spaced vertical slots 136 formed therein, and by a hub 138 depending from the center of the top wall 132 and having a bushing 140 molded into drive assembly 50 and fixedly received on the upper end of the drive shaft 42 of the motor assembly 36.

Figure 4:
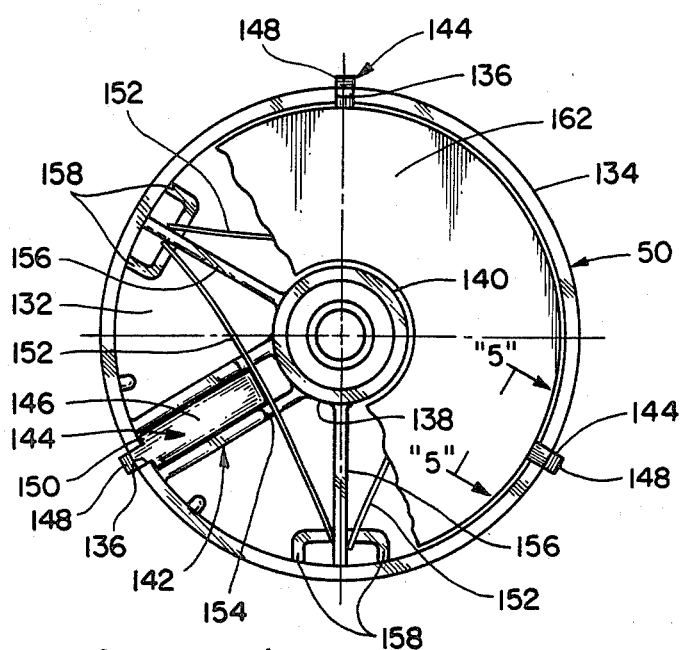
FIG. 4 is an enlarged bottom plan view of the driver assembly shown in FIG. 1 with the bottom cover thereof partially broken away to better show one of the drive slugs.
Figure 5:
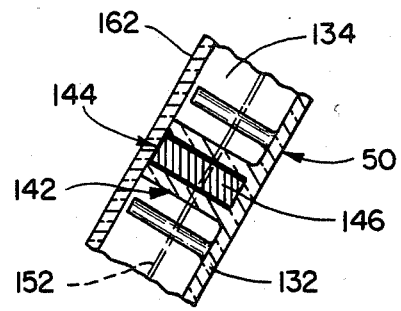
FIG. 5 is an enlarged, fragmentary vertical sectional view taken generally on line 5—5 of FIG. 4.
Figure 6:
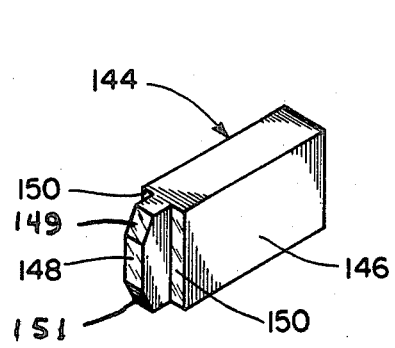
FIG. 6 is an enlarged perspective view of one of the drive slugs of the drive assembly.

Associated with each of the drive assembly slots 136 is a radially disposed and aligned guide formation 142 having a width greater than that of its associated slot 136 and adapted to have a drive slug 144 radially slidable therein. As best illustrated in FIGS. 4 and 6, each drive slug 144 has a main body portion 146 slidable in the guide formation 142 and a reduced width outer end portion 148 slidable through the slots 136 with shoulders 150 defined between the main body portion 146 and the outer end or nose portion 148 being engageable with the inner edges of the slots 136 whereby to limit outward movement of the drive slugs 144 therethrough. In the outermost positions of the drive slugs 144, the outer ends of the nose portions 148 project outwardly of the annular wall 134 for both latching and driving engagement in the driven member slots 118.

When the drive assembly 50 is being rotated at a high rate of speed by the motor assembly 36, centrifugal force working on the mass of the drive slugs 144 holds the drive slugs 144 in their outermost positions with the ends of the nose portions 148 being held in engagement with the inner end surfaces 120 and the bottom walls 124 of the driven member slots 118 whereby to axially latch the driven member 72 to the drive assembly 50. Simultaneously, the leading side edges of the nose portions 148 are in torque-transmitting engagement with the adjacent vertical side walls 122 of the driven member slots 118 whereby to provide a positive driving connection between the drive assembly 50 and the driven filter basket 72.

To bias the drive slugs 144 outwardly even when there is no rotation of the drive assembly 50, light-weight wire leaf springs 152 are provided whereby to initiate axial latching and driving engagement of the drive slugs 144 in the driven member slots 118 when the filter basket 72 is first fitted over the drive assembly 50 and before there is any rotation of the drive assembly 50. To accommodate the wire leaf springs 152, lower inner portions of the guide formations 142 are cut away, as at 154 in FIG. 9, and radial ribs 156 are provided midway between adjacent guide formations 142. Further, curved depending abutments 158 are provided on each side of each rib 156 at the outer ends thereof. As best illustrated in FIGS. 4 and 9, the light-weight wire springs 152 are flexed behind the inner ends of the drive slugs 144 with the opposite ends in engagement with the ribs 156 on either side of the subject drive slug 144 at the outer ends thereof, each spring 152 being disposed against the associated abutments 158 and the cut-away portion 154 of the guide formation 142.

Figure 9:
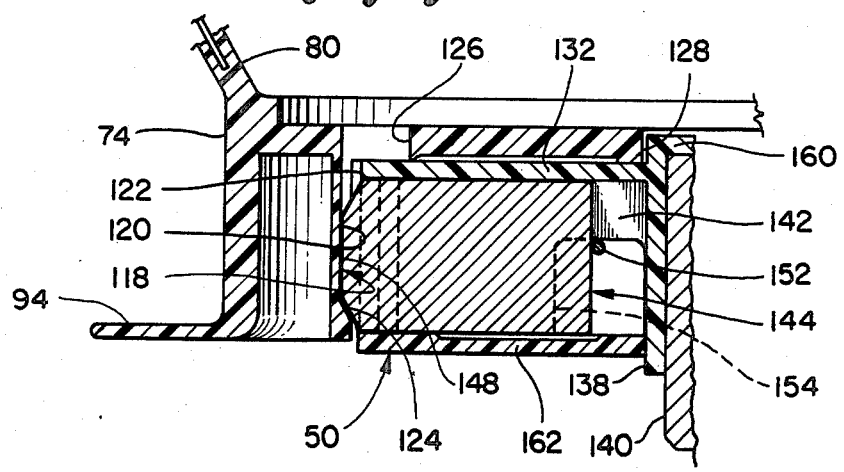
FIG. 9 is an enlarged, fragmentary vertical sectional view taken generally on line 9—9 of FIG. 8.

As best illustrated in FIGS. 6 and 9, the nose portion 148 of each drive slug 144 has its upper and lower corners vertically beveled to define an upper camming surface 149 and a lower camming surface 151. When the driven filter basket 72 is first assembled on the drive assembly 50, the upper camming surface 149 engages the bottom edge of the depending wall formation 76 and cams the drive slugs 144 inwardly to permit the assembly. When the filter basket 72 is disconnected from the drive assembly 50, conversely the lower camming surface 151 working against the inclined bottom wall 124 of the filter basket slots 118 cams the drive slugs 144 inwardly to permit the disconnection. Obviously, if heavier-duty springs were used, these camming actions would meet with more resistance.

It is noted that in the preferred embodiment disclosed in the drawings, whereas only three drive slugs 144 are provided on the drive assembly 50, nine slots or detents 118 are provided on the driven filter basket 72. This arrangement facilitates quick assembly of the filter basket 72 to the drive assembly 50 as the amount of relative rotation between the two is minimized.

As previously noted, the wall 78 underlying the cutter plate 92 is provided in its axial center with a circular recess 128. The top wall 132 of the drive assembly 50 is provided at its center with a raised circular abutment 160 which is receivable in the circular recess 128 whereby to properly axially align the filter basket 72 and the drive assembly 50 and thus minimize vibration at high speeds. With this arrangement, the slug forces are not relied upon to properly center the filter basket 72 on the drive assembly 50. As illustrated in FIG. 4, the drive assembly 50 is provided with a bottom wall 162.

While there has been shown and described a preferred embodiment of the invention, it will be obvious to those skilled in the art that changes and modifications may be made without departing from the invention, and it is intended by the appended claims to cover all such changes and modifications as fall within the true spirit and scope of the invention.

What I claim as new and desire to secure by Letters Patent of the United States is:

1. A juice extractor comprising a rotatable inverted conical filter basket, a motor drive, a drive coupling means at the lower end of said basket for connecting and disconnecting said basket to and from said motor drive, coupling means including a drive assembly secured to said motor drive, a depending coaxial circular wall formation on said filter basket defining a circular recess adapted to receive said drive assembly which is secured to the upper end of a motor drive shaft, the inner surface of said wall formation being provided with a series for circumferentially spaced vertically extending slots having vertically disposed side edges and upwardly and outwardly inclined bottom edges, said drive assembly being generally circular in configuration and having top and bottom walls and a side wall having a series of equidistantly and circumferentially spaced vertical slots formed therein, radially disposed drive slugs slidably mounted in said drive assembly and biased outwardly through each of said slots for latching and driving engagement in one of said filter basket slots, vertically disposed side surfaces of said drive slugs at the outer ends thereof for torque-transmitting driving engagement with said vertically disposed side edges of said filter basket slots, upper and lower corners of the slot-engaging outer ends of said drive slugs being vertically beveled to define camming surfaces which engage said circular wall formation to displace said slugs inwardly upon connection and disconnection of said filter basket to and from said drive assembly.

2. A juice extractor as recited in claim 1 wherein said driven assembly is provided with three slots and three drive slugs.

3. A juice extractor as recited in claim 2 wherein light-weight spring means are provided for biasing said drive slugs outwardly until centrifugal force takes over during high speed rotation of said drive assembly, said light-weight spring means facilitating connecting and disconnecting said filter basket from said drive assembly when there is no rotation thereof.

4. A juice extractor as recited in claim 2 wherein shoulder means on said drive slugs limit outward movement thereof through said driven assembly slots to latching and driving engagement in said filter basket slots.

5. A juice extractor as recited in claim 2 wherein said circular recess defined by said depending wall formation for said driven assembly has a top wall provided with a smaller diameter coaxial recess adapted to receive a raised circular coaxial abutment provided on the top wall of said driven assembly whereby to insure proper alignment of said filter basket and said driven assembly and thus minimize vibration at high speeds.

6. A quick connect/disconnect drive coupling means comprising a driven member having a coaxial circular recess adapted to receive a circular drive assembly, a series of circumferentially spaced vertically disposed slots formed on the inner surface of said circular recess and having vertically disposed side edges and upwardly and outwardly inclined bottom edges, said drive assembly being generally circular in configuration and having opposite end walls and a side wall having a series of equidistantly and circumferentially spaced vertical slots formed therein, radially disposed drive slugs slidably mounted in said drive assembly and biased outwardly through each of said drive assembly slots for latching and driving engagement in one of said driven member slots, vertically disposed side surfaces of said drive slugs at the outer ends thereof for torque-transmitting driving engagement with said vertically disposed side edges of said driven member slots, upper and lower corners of the outer ends of said drive slugs being vertically beveled to define camming surfaces which engage said driven member to cam said slugs inwardly for connection and disconnection of said driven member to and from said drive assembly.

7. A quick connect/disconnect drive coupling means as recited in claim 6 wherein said driven assembly is provided with three slots and three drive slugs.

8. A quick connect/disconnect drive coupling means as recited in claim 6 wherein light-weight spring means are provided for biasing said driving slugs outwardly until centrifugal force takes over during high speed rotation of said drive assembly, said light-weight spring means facilitating connecting and disconnecting said driven member from said drive assembly when there is no rotation thereof.

9. A quick connect/disconnect drive coupling means as recited in claim 6 wherein shoulder means on said drive slugs limit outward movement thereof through said drive assembly slots to latching and driving engagement in said driven member slots.

10. A quick connect/disconnect drive coupling means as recited in claim 6 wherein said circular recess is defined by a depending wall formation and an inner end wall provided with a smaller diameter coaxial recess adapted to receive a raised circular coaxial abutment provided on the adjacent end wall of said drive asesmbly to insure proper alignment of said driven member and said drive assembly and thus minimize vibration at high speeds.

* * * * *